United States Patent Office 3,658,755
Patented Apr. 25, 1972

3,658,755
HOT-MELT ADHESIVES OF POLYOLEFINS CONTAINING OXIME COMPOUNDS OR ESTERS THEREOF
Clive D. Moon and Robert K. F. Neumann, Bartlesville, Okla., assignors to Phillips Petroleum Company
No Drawing. Filed Nov. 7, 1968, Ser. No. 774,200
Int. Cl. C08f 45/60
U.S. Cl. 260—45.9 R                12 Claims

ABSTRACT OF THE DISCLOSURE

Oxime compounds or esters thereof are admixed with polyolefins or polyamides to make a hot-melt adhesive to be applied as a coating or laminate for metal or glass.

---

This invention relates to a method for coating or bonding metal or glass surfaces.

This invention further relates to composite articles of coated or bonded members of metal or glass.

Another aspect of this invention is a new composition of matter suitable as a hot-melt adhesive.

It has been observed that the adhesion of polyolefin and polyamide coatings and laminates on metal or glass are frequently weak. We have, however, discovered a hot-melt adhesive that is surprisingly effective in adhering to these surfaces.

We have specifically discovered that an excellent hot-melt adhesive is formed by admixing an oxime compound or ester thereof into a polyolefin or polyamide. The resulting composition can be extruded as a coating on metal or glass surfaces or extruded therebetween so as to form a laminate.

It is an object of this invention to provide a new composition of matter suitable as a hot-melt adhesive and a process for producing said adhesive.

It is another object of this invention to provide a process for coating a metal or glass surface with a polyolefin or polyamide layer.

It is still another object of this invention to provide a composite article wherein the members of said article are bonded together with a hot-melt adhesive.

Further objects and advantages of our invention will become apparent to those skilled in the art from the description and claims herein set forth.

The polyolefins suitable for employment in this invention can be made by any method known to the art such as the method described in U.S. Pat. 2,825,721 issued Mar. 4, 1958, to Hogan and Banks and British Pat. 853,414 Phillips Petroleum Company (1960) and can be made by the high pressure process or with organo-metal catalyst system and the like.

The polyolefins employed according to this invention generally will be made from monoolefins, contain a maximum of 8 carbon atoms and are normally solid substantially crystalline thermoplastic polymers generally having a density of about .85 to .97.

Exemplary of some of these compounds are p-benclude polyethylene; polypropylene; polybutylene; poly-(4-methyl)pentene-1; and the like, as well as copolymers such as copolymers of ethylene with propylene, 1-butene, and the like.

The polyamides, wherein the structural units are linked by amide or thio-amide groupings, can likewise be produced by any of the methods well known to the art and utilized according to this invention. Exemplary of some polyamides include nylon 6-6, nylon-6, nylon 6-12, nylon 12-12, and the like.

The oxime compounds suitable for use in this invention comprise:

(A) dioximes or esters thereof having the formula

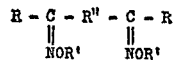

wherein each R is methyl, ethyl, propyl, or phenyl, and wherein said R groups can be identical or dissimilar, and wherein each R' is hydrogen or an acetyl, propionyl, butyryl, sulfonyl, or benzoyl radical and said R' radicals can be identical or dissimilar, and wherein R" is a valence bond or an alkylene radical having 1–4 carbon atoms.

Exemplary of some of these compounds are dimethylglyoxime, diethylglyoxime, methylethylglyoxime, dipropylglyoxime, diisopropylglyoxime, dibutylglyoxime, dimethylglyoxime diacetate, methylethylglyoxime diacetate, diethylglyoxime dimethyl sulfonate, dipropylglyoxime diphenylsulfonate, dibutylglyoxime disulfonate, diisopropylglyoxime dipropionate, 2,4-pentanedione dioxime, 3,5-heptanedione dioxime diacetate, 2,5-octanedione dioxime, and the like.

(B) p-Quinone oximes or derivatives thereof having the formula R'''NOR' and wherein R''' corresponds to one of the following structural formulae:

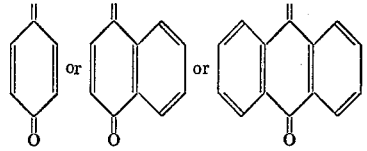

and wherein R' is as defined above.

Exemplary of some of these compounds are p-benzoquinone oxime, p-naphthaquinone oxime, p-anthraquinone oxime, p-benzoquinone oxime acetate, p-benzoquinone oxime methylsulfonate, and the like; or (C) p-Quinone dioximes or derivatives thereof having the formula R''''(NOR')₂ and wherein R'''' corresponds to one of the following structural formulae:

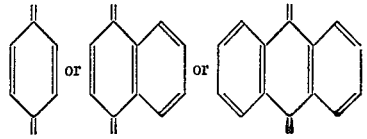

and wherein R' is as defined above.

Exemplary of some of these compounds are 1,4-benzoquinone dioxime, 1,4-benzoquinone dioxime diacetate, 1,4-benzoquinone dioxime dipropionate, 1,4-benzoquinone dioxime dimethylsulfonate, 1,4-benzoquinone dioxime diphenylsulfonate, 1,4-naphthaquinone dioxime, 1,4-naphthaquinone dioxime diacetate, 1,4-naphthaquinone dioxime diphenylsulfonate, 9,10-anthraquinone dioxime, 9,10-anthraquinone dioxime diacetate, 9,10-anthraquinone dioxime diphenylsulfonate, 1,4-benzoquinone dioxime 1-acetate, 4-propionate, 1-phenyl 1,2-propanedione dioxime, 2,4-pentanedione dioxime, 3,6-octanedione dioxime, 3,6-octanedione dioxime diacetate, and the like.

The oximes and esters thereof employed in this invention can be prepared according to any of the methods well known to the art, such as formed from the condensation between amine reagents, such as hydroxylamine, and aldehydes or ketones. One method of oxime preparation is described in Whitmore, Organic Chemistry, D. V. Nostrand Co., Lancaster, Pa., 1937, pp. 428–430 and page 805.

In practicing our invention, the concentration of the particular oxime compound additive employed is about 0.05 to 0.5 weight percent, based on the polyolefin or polyamide.

The oxime compound is dissolved in a suitable nonreactive solvent and slurried with the solid polymer that is in a subdivided state, such as powdered, pelleted, fluffed, or the like.

After the mixture has been slurried, the solvent is removed, generally by evaporation at room temperature or higher, in a current of air, if desired.

Any nonreactive solvent can be employed, but generally a low boiling hydrocarbon or light polar solvent that can be easily removed by evaporation is preferred. Exemplary of suitable solvents are acetone, methyl ethyl ketone, methyl isobutyl ketone, ethyl acetate, butyl acetate, benzene, toluene, and the like.

The amount of solvent required is generally about 60 to 90 cc. of solvent per 100 grams of polymer, but it can vary outside these limits depending upon the amount and kind of the ingredients admixed. An amount sufficient to dissolve the oxime and evenly wet the polymer without excess liquid should be used, and this amount can readily be determined by one skilled in the art.

It is to be understood that additives such as stabilizers, plasticizers, antioxidants, pigments, fillers, dyes, and the like, can be incorporated into the formulation of the hot-melt adhesive and that the polymer and oxime additives can be blended, as in a Brabender plastograph, before employment thereof as a hot-melt adhesive, without departing from the scope or intent of our invention.

The resultant mixture, following evaporation of the solvent, is then employed as a hot-melt adhesive. Any of the methods known to the art can be employed for applying the hot-melt adhesive to the metal or glass substrate so as to provide a smooth molten coating of the desired thickness.

One method of employing the hot-melt adhesive composition is to heat the composition until it is fused and has the viscosity required for extrusion application. The fused adhesive composition is then applied to a surface of a base member and a second member, to be bonded to the base member, is joined thereto immediately while the adhesive is in the fused state. Cooling to room temperature will provide solidification of the adhesive and form a firm bond or laminate between the members. Pressure can be applied to the members during the cooling so as to provide good contact between the adhesive and the members.

In another method, the hot-melt adhesive composition is applied as an extrusion coating to a surface of the member and allowed to cool thus forming a protective film or coating thereon.

Polymer coatings of our invention can be applied to substantially any metal article or glass for the prevention of corrosion in corrosive environments e.g., submerged in or adjacent to salt brine such as sea water or oil field waters. It can also be employed as inert liners for metal cans, in the coating of metal foils and wire, or employed in the manufacture of condenser plates and the like.

Exemplary of our invention and not to be interpreted as a limitation upon the ingredients employed or upon the scope thereof, the following example is presented.

EXAMPLE I

Several different kinds of oxime compounds were incorporated into resins. The oxime compound additive was dissolved in 40 cc. acetone and slurried in 50 grams of the polymer. The solvent was allowed to evaporate and the resulting composition heated and applied between two metal or glass members. After cooling at a rate of about 27° F. per minute the bond was tested on the Instron according to ASTM designation D–1002–64, except that the overlapping of the members was one inch. The results of these tests on the particular members employed, and the concentration of the oxime compound additive to the particular polymer used are reported in Table I, thus effectively demonstrating the outstanding quality of the hot-melt adhesives of this invention. The metal strips were degreased in hot xylene and air dried prior to the application of the hot-melt adhesive.

TABLE I

| Polymer | Oxime compound addition | Member | Lap shear tensile, lbs./in. |
|---|---|---|---|
| Nylon 6–6 | 0.25% p-quinonedioxime diacetate | Stainless steel | 1,700 |
| Do | 0% p-quinonedioxime diacetate | do | 1,000 |
| Polyethylene | do | Iron | 990 |
| Do | do | Aluminum | 770 |
| Do | 0.1% p-quinonedioxime diacetate | Iron | 1,760 |
| Do | do | Aluminum | 1,015 |
| Do | 0.5% p-quinonedioxime diacetate | Iron | 1,880 |
| Do | do | Aluminum | 990 |
| Polypropylene | do | Stainless steel | 3,000 |
| Do | do | Brass | 2,300 |
| Do | do | Copper | 2,075 |
| Do | do | Aluminum | 2,400 |
| Do | do | Iron | 2,400 |
| Do | do | Glass | 200–900 |
| Do | .25% anthraquinone monoxime | do | 205 |
| Do | do[1] | do | 195 |
| Do | .25% anthraquinone dioxime | do | 160 |
| Do | do[1] | do | 180 |
| Do | .25% anthraquinone diacetate | do | 575 |
| Do | do[1] | do | 1,420 |
| Do | .25% dimethylglyoxime | do | 80 |
| Do | do[1] | do | 580 |
| Do | 1% p-quinonedioxime | Iron | 793 |
| Do | .5% p-quinonedioxime | do | 860 |
| Do | 0.20 p-quinonedioxime | do | 707 |
| Do | 0.10 p-quinonedioxime | do | 523 |
| Do | 0.2 p-quinonedioxime diacetate | do | 2,200 |
| Do | 0.1 p-quinonedioxime diacetate | do | 2,063 |
| Do | 0.05 p-quinonedioxime diacetate | do | 1,120 |
| Do | 1.0 p-quinonedioxime di(methylsulfonate) | do | 2,027 |
| Do | 0.25 p-quinonedioxime di(methylsulfonate) | do | 2,288 |
| Do | do | do | 2,475 |
| Do | 0.25 p-quinonedioxime di(benzenesulfonate) | do | 2,400 |
| Do | 0.25 p-quinonedioxime dibenzoate | do | 2,200–2,400 |

[1] Plastographed for 3 min. at 190° C. before making the lap joints.

As will be evident to those skilled in the art, various modifications of this invention can be made or followed in light of the disclosure and the discussion herein set forth, without departing from the scope or spirit of this invention.

We claim:

1. A hot-melt adhesive composition comprising
   (1) a normally solid crystalline thermoplastic polymer selected from the group consisting of homopolymers and copolymers of monoolefinic hydrocarbons having a maximum of 8 carbon atoms and no branching nearer the double bond than the 4-position; and
   (2) an additive compound selected from the group consisting of (a) dioximes and esters thereof having the formula $$R-\underset{NOR'}{\overset{\|}{C}}-R''-\underset{NOR'}{\overset{\|}{C}}-R$$

wherein each R is independently selected from the group consisting of methyl, ethyl, propyl, and phenyl; wherein R'' is a valence bond or an alkylene radical having 1–4 carbon atoms; wherein each R' is independently selected from the group consisting of hydrogen, acetyl, propionyl, butyryl, sulfonyl, and benzoyl;

(b) p-quinone oximes and derivatives thereof having the formula R'''NOR' wherein R''' corresponds to one of the following structural formulae:

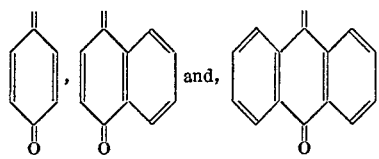

and wherein R' is as defined hereinabove;

(c) p-quinone dioximes and derivatives thereof having the formula R''''(NOR')$_2$ wherein R'''' corresponds to one of the following structural formulae:

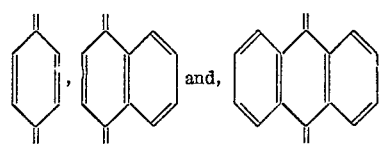

and wherein R' is as defined hereinabove.

2. The composition of claim 1 wherein the concentration of said additive compound is 0.05 to 0.5 weight percent of said normally solid crystalline thermoplastic polymer.

3. The composition of claim 1 wherein said normally solid crystalline thermoplastic polymer is selected from the group consisting of polymers and copolymers of ethylene and propylene.

4. The composition of claim 1 wherein said compound is p-quinone dioxime diacetate.

5. The composition of claim 1 wherein said compound is p-quinone dioxime dimethylslfonate or p-quinone dioxime diphenylsulfonate.

6. The composition of claim 1 wherein said compound is anthraquinone dioxime diacetate.

7. The composition of claim 1 wherein said additive compound is selected from the group consisting of dimethylglyoxime, diethylglyoxime, methylethylglyoxime, dipropylglyoxime, diisopropylglyoxime, dibutylglyoxime, dimethylglyoxime diacetate, methylethylglyoxime diacetate, diethylglyoxime dimethyl sulfonate, dipropylglyoxime diphenylsulfonate, dibutylglyoxime disulfonate, diisopropylglyoxime dipropionate, 2,4-pentanedione dioxime, 3,5-heptanedione dioxime diacetate, and 2,5-octanedione dioxime.

8. A composite article comprising at least 2 members bonded together with a hot-melt adhesive composition as defined by claim 1.

9. A composite article in accordance with claim 8 wherein said members are articles of manufacture having metal or glass surfaces.

10. A composite article in accordance with claim 9 wherein said metal surfaces are selected from the group consisting of steel, brass, copper, aluminum, and iron.

11. A composite article in accordance with claim 10 wherein the polymer is polyethylene.

12. A composite article in accordance with claim 10 wherein the polymer is polypropylene.

References Cited

UNITED STATES PATENTS

| | | | |
|---|---|---|---|
| 3,346,523 | 10/1967 | Wiese | 260—45.9 |
| 3,347,810 | 10/1967 | Johnson | 260—45.9 |
| 3,374,248 | 3/1968 | Mitchell | 260—45.9 |
| 3,374,249 | 3/1968 | Mitchell | 260—45.9 |
| 3,374,250 | 3/1968 | Mitchell | 260—45.9 |

OTHER REFERENCES

Handbook of Adhesives by Skeist pp. 447–448, Reinhold Publishing Co., London, TP 968, SS, C.2, copy in Group 140.

DONALD E. CZAJA, Primary Examiner

E. C. RZUCIDLO, Assistant Examiner

U.S. Cl. X.R.

161—203, 216; 260—32.4